United States Patent
Ball et al.

(10) Patent No.: US 9,999,236 B2
(45) Date of Patent: Jun. 19, 2018

(54) CONFECTIONERY COMPOSITION COMPRISING A FAT SYSTEM

(71) Applicant: Mondelez UK R&D Limited, Birmingham (GB)

(72) Inventors: Billie Ball, Birmingham (GB); Emma Cope, Birmingham (GB)

(73) Assignee: Mondelez UK R&D Limited, Bournville (GB)

( * ) Notice: Subject to any disclaimer, the term of this patent is extended or adjusted under 35 U.S.C. 154(b) by 744 days.

(21) Appl. No.: 14/363,471

(22) PCT Filed: Jan. 15, 2013

(86) PCT No.: PCT/GB2013/050078
§ 371 (c)(1),
(2) Date: Jun. 6, 2014

(87) PCT Pub. No.: WO2013/108019
PCT Pub. Date: Jul. 25, 2013

(65) Prior Publication Data
US 2014/0363543 A1 Dec. 11, 2014

(30) Foreign Application Priority Data

Jan. 16, 2012 (GB) .................................. 1200707.6

(51) Int. Cl.
A23G 1/36 (2006.01)
A23G 1/54 (2006.01)
A23G 3/40 (2006.01)
A23G 3/52 (2006.01)
A23G 3/54 (2006.01)

(52) U.S. Cl.
CPC ................. *A23G 1/36* (2013.01); *A23G 1/54* (2013.01); *A23G 1/545* (2013.01); *A23G 3/40* (2013.01); *A23G 3/52* (2013.01); *A23G 3/545* (2013.01); *A23G 2200/00* (2013.01); *A23G 2220/20* (2013.01); *A23V 2002/00* (2013.01)

(58) Field of Classification Search
CPC ..................................................... A23G 1/36
See application file for complete search history.

(56) References Cited

U.S. PATENT DOCUMENTS

| 5,400,614 A * | 3/1995 | Feola ................. A23G 9/163 366/102 |
| 7,452,564 B2 * | 11/2008 | Jindra ................. A21D 13/38 426/657 |
| 2004/0005386 A1 * | 1/2004 | Refer .................. A23G 1/0063 426/89 |
| 2008/0038435 A1 | 2/2008 | Miller | |

FOREIGN PATENT DOCUMENTS

| EP | 1862077 A1 | 12/2007 | |
| GB | 2471149 A | 12/2010 | |
| JP | 2007135431 A | 6/2007 | |
| WO | 9319077 A1 | 9/1993 | |
| WO | WO 0215717 A1 * | 2/2002 | ............... A23G 3/40 |
| WO | 03037095 A1 | 5/2003 | |
| WO | 03/075672 A1 | 9/2003 | |
| WO | 03080779 A1 | 10/2003 | |
| WO | 2006037341 A1 | 4/2006 | |
| WO | 20081035968 A2 | 3/2008 | |

OTHER PUBLICATIONS

"Melting Point of Butter"—The Physics Factbook. Available online as of 2003 from http://hypertextbook.com, pp. 1-2.*
Sundram, et al. "Palm fruit chemistry and nutrition". Asia Pacific J Clin Nutr 2003; 12 (3): 355-362.*
Derwent abstract of WO0215717. Publication data Jan. 28, 2002. pp. 1-3.*
Examination Report dated Feb. 10, 2016 for Canadian Application No. 2,857,756 (4 pgs.).
Intellectual Property Office Search Report dated May 16, 2012 for Application No. GB 1200707.6 (4 pgs.).
Written Opinion of the International Searching Authority for PCT/GB2013/050078 (4 pgs.).
Saadah Mastura Saidin et al; "Melting Behaviour of Binary Mixtures of Palm Mid Fraction and Rice Bran Oil" Sains Malaysiana; vol. 39(5), 2010, pp. 785-790 (6 pgs.).
International Search Report dated Jun. 24, 2013 for PCT/GB2013/050078 (3 pgs.).

* cited by examiner

*Primary Examiner* — Jenna A Watts
(74) *Attorney, Agent, or Firm* — Fitch, Even, Tabin & Flannery LLP

(57) ABSTRACT

A confectionery composition comprising an edible shell having a filling therein. The filling comprises a fat system and has a solid fat content (SFC) of 35 to 65% at 0° C. and 1 to 8% at 30° C. In particular embodiments the fat system is prepared from palm oil midfraction. The filling is soft at low temperature so that it is palatable. However, it does not melt at ambient temperatures and therefore does not require refrigeration/freezing for storage or transport.

16 Claims, 2 Drawing Sheets

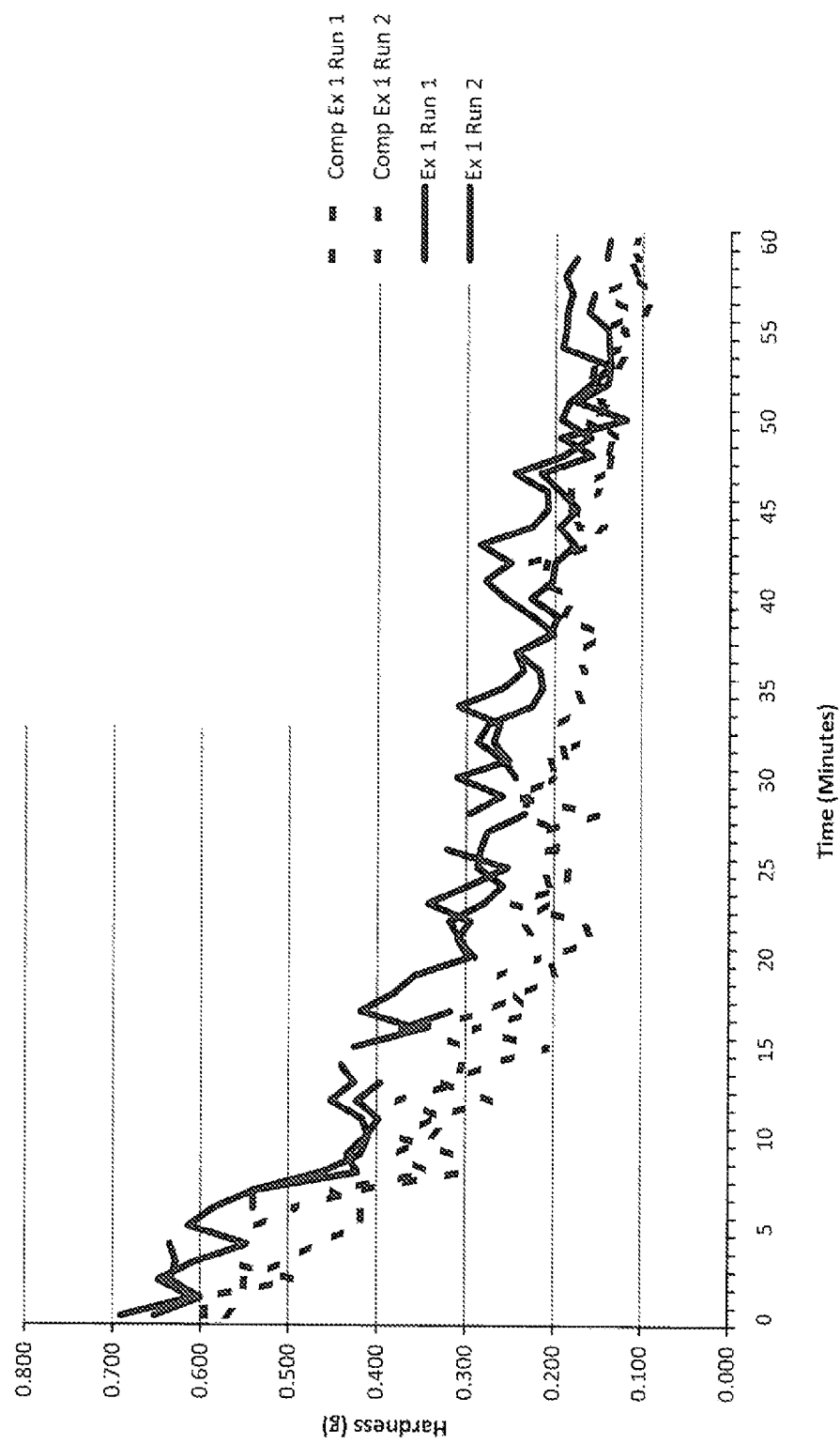

CONFECTIONERY COMPOSITION COMPRISING A FAT SYSTEM

CROSS REFERENCE TO RELATED APPLICATIONS

This application is a U.S. national phase application of International Application No. PCT/GB2013/050078, filed Jan. 15, 2013, which claims benefit from Great Britain Application No. 1200707.6, filed Jan. 16, 2012, which are hereby each incorporated herein by reference in their entirety.

The present invention relates to a confectionery composition comprising a specified fat system. In particular, the present invention relates to a confectionery composition comprising an edible shell having a filling therein, wherein the fat system is present in the filling.

There is continuing desire to provide new products and eating experiences for consumers. Iced confectionery, such as chocolate enrobed ice-cream (e.g. choc-ice), is very popular. They provide a satisfying contrast between the crisp chocolate shell and the cool, soft filling. However they suffer from the disadvantage that they must be kept frozen until consumption. This requires energy and is therefore expensive and environmentally unfriendly. Many chocolates combine a chocolate shell with a softer filling (such as a truffle). These chocolates do not require refrigeration but are not palatable when eaten chilled or frozen. If chilled or frozen, the filling is hard and difficult to bite into and there is no contrast between the shell and soft filling. The Côte D'Or Zero™ bar is marketed as tasting best when chilled but its filling is hard at chilled temperatures. A cooling effect is achieved through the use of ingredients, especially a specific fat make-up.

The present invention provides a confectionery composition that alleviates one or more of the problems mentioned above.

According to a first aspect of the invention there is provided a confectionery composition comprising a fat system, wherein the fat system is soft at low temperature and remains solid at ambient temperature.

According to a second aspect of the invention there is provided a confectionery composition comprising a fat system, wherein the fat system has a solid fat content (SFC) of 35 to 65% at 0° C. and 1 to 8% at 30° C.

The fat system of the invention remains solid from low to ambient temperature. The fat system is soft at low temperature so that it is palatable. However, it does not melt at ambient temperatures and therefore does not require refrigeration/freezing for storage or transport.

In a particular embodiment the confectionery composition comprises an edible shell having a filling therein, wherein the fat system is present in the filling. In one such embodiment the fat system and the filling have a solid fat content of 35 to 65% at 0° C. and 1 to 8% at 30° C.

According to a third aspect of the present invention there is provided a confectionery composition comprising an edible shell having a filling therein, wherein the filling comprises a fat system and the filling has a solid fat content (SFC) of 35 to 65% at 0° C. and 1 to 8% at 30° C.

This embodiment has benefits over corresponding confectionery products comprising shells and fillings such as choc-ices or conventional chocolates with fillings. A choc-ice provides a soft sensation at low temperature but requires refrigeration at ambient temperatures. A conventional truffle filled chocolate is stable at ambient temperature but is very hard at low temperature. We estimate a conventional truffle filling to be 2 to 5 times as hard as the filling of the present invention at low temperature. The filling of the present invention is soft at low temperature and remains solid at ambient temperature. The filling has a SFC of 35 to 65% at 0° C. and 1 to 8% at 30° C.

In some embodiments, the low temperature is from 0 to 10° C., from 0 to 8° C. or from 2 to 6° C., in particular 0, 1, 2, 3, 4, 5, 6, 7, 8, 9 or 10° C.

In some embodiments, the ambient temperature is from 15 to 30° C. or from 18 to 25° C., in particular 15, 16, 17, 18, 19, 20, 21, 22, 23, 24, 25, 26, 27, 28, 29 or 30° C.

In a particular embodiment the fat system and/or the filling is solid from 0 to 30° C.

In a particular embodiment the fat system is prepared by blending different fractions of palm oil. The fractions are carefully selected so that fat system has the required SFC curve for the filling to be stable at ambient temperature whilst being sufficiently soft at chilled temperature. Commonly, sharp SFC curves are easier to achieve with lauric fats (e.g. coconut or palm kernel). However, lauric fats can have a negative impact in some circumstances. For example, lauric fats can cause excessive softening making them less suitable for use in confectionery compositions.

In one embodiment the filling/fat system comprises triglycerides. In another embodiment the filling/fat system consists of triglycerides. In a particular embodiment the triglycerides are non-lauric triglycerides.

In one embodiment the filling/fat system comprises triglycerides from palm oil (not palm kernel). In a further embodiment the filling/fat system comprises triglycerides from palm oil mid-fraction.

In one embodiment the filling/fat system comprises one or more triglycerides from the group comprising PPM, PPP, MOP, PPS, POP, PLP, PPS, POS, POO, PLS, PLO, PLL, SSS, SOS, SOO, SLS+OOO, SLO, OLO, SLL, AOS, AOO and combinations thereof (where O is oleic (C18:1), M is myristic (C14:0), P is palmitic (C16:0), S is stearic (C18:0), L is linoleic (C18:2) and A is arachidic (C20:0)).

The triglycerides in a product can be described with reference to a triglyceride profile.

In one series of embodiments the triglyceride profile of the filling/fat system comprises at least 1%, 2%, 3%, 4%, 5%, 10%, 15%, 20%, 25%, 30%, 35%, 40% or 45% of a given triglyceride. In an alternative embodiment the triglyceride profile of the filling/fat system comprises less than 50%, 45%, 40%, 35%, 30%, 25%, 20%, 15%, 10%, 5%, 4%, 3%, 2% or 1% of a given triglyceride.

In one series of embodiments the triglyceride profile of the filling/fat system comprises at least 10%, 15%, 20%, 25% or 30% POP. In an alternative series of embodiments the triglyceride profile of the filling/fat system comprises less than 50%, 40%, 35%, 30%, 25% or 20% POP. In a particular embodiment the triglyceride profile of the filling/fat system is at least 10% POP and less than 35% POP.

In one series of embodiments the triglyceride profile of the filling/fat system comprises at least 5%, 10%, 15%, 20%, 25% or 30% POO. In an alternative series of embodiments the triglyceride profile of the filling/fat system comprises less than 35%, 30%, 25%, 20%, 15%, 10% or 5% POO. In a particular embodiment the triglyceride profile of the filling/fat system is at least 15% POO and less than 20% POO.

In one series of embodiments the triglyceride profile of the filling/fat system comprises at least 1%, 3%, 5%, 10%, 15% or 20% PLO. In an alternative series of embodiments the triglyceride profile of the filling/fat system comprises less than 25%, 20%, 15%, 10%, 5% or 3% PLO. In a particular embodiment the triglyceride profile of the filling/ fat system comprises at least 5% PLO and less than 10% PLO.

In one series of embodiments the triglyceride profile of the filling/fat system comprises at least 1%, 3%, 5%, 10%, 15% or 20% PLP. In an alternative series of embodiments the triglyceride profile of the filling/fat system comprises less than 25%, 20%, 15%, 10%, 5% or 3% PLP.

In one series of embodiments the triglyceride profile of the filling/fat system comprises at least 3%, 5%, 10%, 12% or 15% POS. In an alternative series of embodiments the triglyceride profile of the filling/fat system comprises less than 30%, 20%, 15%, 10%, 5% or 3% POS. In a particular embodiment the triglyceride profile of the filling/fat system is at least 5% POS and less than 15% POS.

In one embodiment the triglyceride profile of the filling/ fat system comprises 15 to 30% POP and 10 to 25% POO. In a further embodiment the triglyceride profile of the filling/fat system comprises 15 to 30% POP, 10 to 25% POO, 3 to 15% PLO and 3 to 15% PLP.

In one embodiment the triglyceride profile of the filling/ fat system comprises 10 to 15% POP and 15 to 20% POO. In a further embodiment the triglyceride profile of the filling/fat system comprises 10 to 15% POP, 15 to 20% POO, 3 to 8% PLO and 10 to 15% POS.

In one embodiment the filling/fat system comprises fatty acids. In one embodiment the filling/fat system comprises one or more fatty acids from the group comprising C4:0, C6:0, C8:0, C10:0, C12:0, C14:0, C14:1, C15:0(1), C15:0, C16:0, C16:1, C17:0(1), C17:0, C18:0(1), C18:1(trans), C18:1(cis), C18:2(trans), C18:2(cis), C18:3(gamma), C18: 3(alpha), C20:0, C20:1, C22:0, C24:0 and combinations thereof.

In one series of embodiments the fatty acid profile of the filling/fat system comprises at least 1%, 2%, 3%, 4%, 5%, 10%, 15%, 20%, 25%, 30%, 35%, 40% or 45% of a given fatty acid. In an alternative series of embodiments the fatty acid profile of the filling/fat system comprises less than 50%, 45%, 40%, 35%, 30%, 25%, 20%, 15%, 10%, 5%, 4%, 3%, 2% or 1% of a given fatty acid.

In one series of embodiments the fatty acid profile of the filling/fat system comprises at least 10%, 15%, 20%, 25%, 30% or 35% C16:0 (palmitic acid). In an alternative series of embodiments the fatty acid profile of the filling/fat system comprises less than 50%, 45%, 40%, 35%, 30% or 25% C16:0. For comparison cocoa butter comprises 0-10% C16: 0.

In one series of embodiments the fatty acid profile of the filling/fat system comprises at least 10%, 15%, 20%, 25%, 30% or 35% C18:1 (cis). In an alternative series of embodiments the fatty acid profile of the filling/fat system comprises less than 60%, 55%, 50%, 45%, 40%, 35%, 30% or 25% C18:1 (cis). For comparison cocoa butter comprises 29-38% C18:1 (cis).

In one series of embodiments the fatty acid profile of the filling/fat system comprises at least 5%, 10%, 12%, 15%, or 18% C18:0. In an alternative series of embodiments the fatty acid profile of the filling/fat system comprises less than 40%, 30%, 20% or 10% C18:0. For comparison cocoa butter comprises 24-37% stearic acid.

In a particular embodiment the fatty acid profile of the filling/fat system comprises 20 to 50% C16:0 and 20 to 50% C18:1 (cis).

In one series of embodiment the fatty acid profile of the filling/fat system comprises less than 57, 55, 53 or 50 or 48% saturated fatty acids (SFA). In one series of embodiments the fatty acid profile of the filling/fat system comprises at least 35, 40, 43, 45 or 48% saturated fatty acids. For comparison, it should be noted that cocoa butter generally comprises 57-64% saturated fatty acid and 36-43% unsaturated fatty acids. There is a widespread desire for consumers to reduce the amount of saturated fat in their diets for health reasons.

The fat system and/or the filling can be considered solid if it does not exhibit flow behaviour. In one embodiment the fat system and/or the filling is considered solid if it has a solid fat content (SFC) of greater than 1%.

Solid Fat Content (SFC) is the generally accepted analysis of fats and oils in the food industry. SFC is typically determined using nuclear magnetic resonance (NMR) where it is based on a direct ratio measurement between the solid and liquid parts of the sample observed in the NMR Free Induction Decay (FID). The official standards are:

AOCS Cd 16b-93 revised in 2000; Direct Method (USA)
AOCS Cd 16-81 revised in 2000, Indirect Method (USA)
ISO 8292 (Europe)
IUPAC 2.150 (Europe)

SFC can be measured "unstabilized" or stabilized at a given temperature. Stabilised and unstabilised refers to the fat crystals in the fat system or the filling.

The SFC of a fat system will decrease with increasing temperature as the fats in the fat system melt. The melt profile has significant effects on the properties of products made from the fat system.

For the avoidance of doubt, when reference is made to the SFC of the filling, the SFC of the total fat (from the fat system and any other ingredients within the filling) is intended.

In one series of embodiments the filling and/or the fat system has a SFC at 0° C. of at least 35%, 40%, 45%, 50%, 55%, 60% or 65%. In another series of embodiments the filling and/or fat system has a SFC at 0° C. of less than 65%, 60%, 55% or 50%. In particular embodiments the filling and/or the fat system has a SFC at 0° C. of from 45 to 65%, from 50 to 60% or from 53 to 57%.

In one series of embodiments the filling and/or the fat system has a SFC at 10° C. of at least 15%, 20%, 25%, 30%, 35%, 40%, 45%, 50%, 55% or 60%. In another series of embodiments the filing and/or the fat system has a SFC at 10° C. of less than 60%, 55%, 50%, 45%, 40%, 35%, or 30%. In a particular embodiment the fat system has a SFC at 10° C. of from 30 to 40° C., from 32 to 38% or from 34 to 36%.

In one series of embodiments the filling/and or the fat system has a SFC at 15° C. of at least 5%, 10%, 15%, 20%, 25%, 30%, 35%, 40%, 45% or 50%. In another series of embodiments the filling and/or the fat system has a SFC at 15° C. of less than 50%, 45%, 40%, 35%, 30%, 25%, 20% or 15%. In particular embodiments the filling and/or the fat system has a SFC at 15° C. of from 15 to 30%° C., from 17 to 26% or from 20 to 24%

In one series of embodiments the filling and/or the fat system has a SFC at 20° C. of at least 3%, 4%, 5%, 6%, 7%, 8%, 9%, 10%, 11%, 12%, 13%, 14%, 15%, 16%, 17%, 18%, 19%, 20%, 21%, 22%, 23%, 24% or 25%. In another series of embodiments the filling and/or the fat system has a SFC at 20° C. of less than 40%, 35%, 30%, 25%, 24%, 23%, 22%, 21%, 20%, 19%, 18%, 17%, 16%, 15%, 14%, 13%, 12%, 11%, 10%, 9% or 8%. In particular embodiments the filling and/or the fat system has a SFC at 20° C. of from 5 to 20%, from 7 to 15% or from 8 to 10%

In one series of embodiments the filling and/or the fat system has a SFC at 25° C. of at least 1%, 2%, 3%, 4%, 5%, 6%, 7%, 8%, 9%, 10%, 11%, 12%, 13%, 14%, 15%, 16%, 17%, 18%, 19%, or 20%. In another series of embodiments the filling and/or the fat system has a SFC at 25° C. of less than 30%, 25%, 24%, 23%, 22%, 21%, 20%, 19%, 18%, 17%, 16%, 15%, 14%, 13%, 12%, 11%, 10%, 9%, 8%, 7%, 6%, 5%, 4% or 3%. In particular embodiments the filling and/or the fat system has a SFC at 25° C. of from 2 to 12%, from 3 to 8% or from 4 to 7%

In one series of embodiments the filling and/or the fat system has a SFC at 30° C. of at least 1%, 2%, 3%, 4%, 5%, 6%, or 7%. In another series of embodiments the filling and/or the fat system has a SFC at 30° C. of less than 8%, 7%, 6%, 5%, 4%, 3% or 2%. In particular embodiments the filling and/or the fat system has a SFC at 30° C. of from 1 to 8%, from 1.5 to 5% or from 2 to 4%

In one embodiment the filling/fat system has a SFC at 0° C. of from 5 to 60% and a SFC at 25° C. of from 4 to 20%.

In a further embodiment the filling/fat system has a SFC at 0° C. of from 5 to 60%, an SFC at 10° C. of at from 30 to 50%, an SFC at 15° C. of from 18% to 25%, an SFC at 20° C. of from 8 to 15%, an SFC at 25° C. of from 4 to 10% and an SFC at 30° C. of from 2 to 5%.

The ratio of the SFC of the fat system and/or filling at low and ambient temperatures provides an indication of the melt profile. In one embodiment the ratio of the SFC at low temperature to the SFC at ambient temperature is less than 7, 6, 5 or 4. In another embodiment the ratio of the SFC at low temperature to the ratio at ambient temperature is at least 2, 3, 4 or 5. In a particular embodiment the ratio of the SFC at low temperature to the SFC at high temperature is from 2 to 4.

The ratio of the SFC of the fat system and/or the filling at 10 and 20° C. provides an indication of the melt profile. In one embodiment the ratio of the SFC at 10° C. to the SFC at 20° C. is less than 7, 6, 5 or 4. In another embodiment the ratio of the SFC at 10° C. to the SFC at 20° C. is at least 2, 3, 4 or 5. In a particular embodiment the ratio of the SFC at low temperature to the SFC at high temperature is from 2 to 4.

The hardness of the filling and/or the fat system can be measured using the following protocol:

60 samples are obtained and aged for 2 weeks after production at 15° C. followed by 24 hours stored at 5° C. (e.g. in a fridge). This allows the product to settle at consumption temperature. The samples are removed from the fridge and stored at a room temperature of 21° C. with hardness measurements taken at 1 minute intervals over a one hour period. The hardness measurement is taken with a 2 mm cylinder stainless steel probe that penetrates the sample for a distance of 8 mm. The information will typically be graphed so that results from the shell (if present) can be ignored.

In one embodiment the filling has a hardness at 5° C. (0 minutes in the above-mentioned protocol) of less than 1 g, 0.9 g, 0.8 g, 0.7 g, 0.6 g or 0.5 g. In an alternative embodiment the filling has a hardness at 5° C. (0 minutes in the above-mentioned protocol) of more than 0.1 g, 0.2 g, 0.3 g, 0.4 g, 0.5 g or 0.6 g. In a particular embodiment the filling has a hardness at 5° C. (0 minutes in the above-mentioned protocol) of from 0.5 to 0.8 g.

In one embodiment the filling has a hardness at 35 minutes in the above-mentioned protocol of less than 0.8 g, 0.7 g, 0.6 g, 0.5 g, 0.4 g, 0.3 g or 0.2 g. In an alternative embodiment the filling has a hardness at 35 minutes in the above-mentioned protocol of more than 0.1 g, 0.2 g or 0.3 g. In a particular embodiment the filling has a hardness at 35 minutes in the above-mentioned protocol of from 0.2 to 0.4 g.

In one embodiment the filling has a hardness at 21° C. (60 minutes in the above-mentioned protocol) of less than 0.5 g, 0.4 g, 0.3 g, 0.2 g, 0.1 g or 0.05 g. In an alternative embodiment the filling has a hardness at 21° C. (35 minutes in the above-mentioned protocol) of more than 0.02 g, 0.05 g, 0.1 g, 0.15 g, 0.2 g or 0.3 g. In a particular embodiment the filling has a hardness at 21° C. (60 minutes in the above-mentioned protocol) of from 0.1 to 0.2 g.

In one embodiment the filling has a hardness profile as shown in FIG. 2.

In one embodiment where the confectionery composition comprises a shell and a filling, the shell is a crisp shell. In this way, the shell cracks when the consumer bites into it, thereby providing a contrast with the filling therein.

In a particular embodiment the shell is a chocolate shell such as a milk chocolate shell, a dark chocolate shell, a white chocolate shell or a compound chocolate shell. The term "chocolate" in the context of the present invention is not restricted by the various definitions of chocolate provided by government and regulatory bodies. A chocolate is simply a product obtained from cocoa products and sweeteners.

In an alternative embodiment the shell is a candy shell or a wafer shell.

In one embodiment the shell encloses the filling entirely. In an alternative embodiment the shell is open, e.g. cup shaped.

In one embodiment the shell has a thickness of from 0.5 mm to 5 mm or from 1 to 3 mm. In a particular embodiment the shell has a thickness of 2 mm. A thin shell cracks easily on biting providing a pleasant contrast with the filling therein.

In one embodiment the shell comprises inclusions such as nuts, biscuits, chopped fruit, chocolate chips or vermicelli or any combination thereof, for example.

In one series of embodiments at least 10%, 15%, 20%, 25%, 30%, 35%, 40%, 45%, 50%, 55%, 60%, 65%, 70%, 75%, 80%, 85%, 90% or 95% of the filling is constituted by the fat system. In a particular embodiment the fat system is the filling.

In an alternative series of embodiments less than 100%, 95%, 90%, 85%, 80%, 75%, 70%, 65%, 60%, 55%, 50%, 45%, 40%, 35%, 30%, 25%, 20%, 15% or 10% of the filling is constituted by the fat system. In a particular embodiment 30 to 50% or 35 to 45% of the filling is constituted by the fat system i.e. the filling is 30 to 50% or 35 to 45% fat system.

In one embodiment the filling comprises one or more of the following ingredients in addition to the fat system: bulk sweetener (including saccharides such as sucrose, glucose, fructose, corn syrup, polydextrose and icing sugar, for example, or polyols such as sorbitol, mannitol, maltitol, isomalt, xylitol or erythritol, for example), flavours (including vanilla, caramel, cheese cake), cocoa powder, cream powder, milk powder, cheese powder, emulsifier (including lecithin), high intensity sweeteners (such as aspartame, Ace-K, saccharin and the like, for example) and colourings (including beta carotene).

In one series of embodiments the filling comprises at least 10%, 15%, 20%, 25%, 30%, 40%, 45% or 50% bulk sweetener (such as sucrose). In an alternative series of embodiments the filling comprises less than 70%, 65%, 60%, 55%, 50%, 45%, 40%, 35%, 30%, 25%, 20%, 15% or 10% bulk sweetener (such as sucrose). In a particular embodiment the filling comprises from 25 to 50% or 30 to 45% bulk sweetener (such as sucrose).

In one embodiment the filling comprises 35 to 45% fat system and 30 to 45% bulk sweetener.

In one embodiment the filling comprises at least one dairy-based powder such as milk powder (including skimmed milk powder), cream powder, cheese powder and whey powder. In one series of embodiments the filling comprises at least 1%, 3%, 6%, 8%, 10%, 12%, 14%, 16%, 18% or 20% dairy-based powder. In another series of embodiments the filling comprises less than 40%, 30%, 25%, 20%, 15%, 10% or 5% dairy based powder. In a particular embodiment the filling comprises from 8 to 12% cheese powder and/or from 8 to 12% cream powder.

In one series of embodiments the filling comprises from 1 to 20%, from 5 to 15%, or from 10 to 13% cocoa powder.

In one embodiment the filling is aerated. In one series of embodiments the filling has a density of from 0.5 to 1.3, 0.6 to 1.1, 0.7 to 1.0 or 0.8 to 0.9 g/cm$^3$.

In one series of embodiments the filling has a water activity at 25° C. of less than 0.5, 0.4, 0.3 or 0.2. In one series of embodiments the filling comprises less than 5, 4, 3, 2 or 1% water. A high water content filling can have adverse effects on the shell. For example, a chocolate shell can suffer from "sugar bloom".

BRIEF DESCRIPTION OF DRAWINGS

The invention will now be described with reference to the following examples and figures.

FIG. 2 is a graph showing the hardness of a confectionery product in accordance with an embodiment of the invention and a comparative example.

METHODOLOGY

Solid Fat Content

Figure 1:
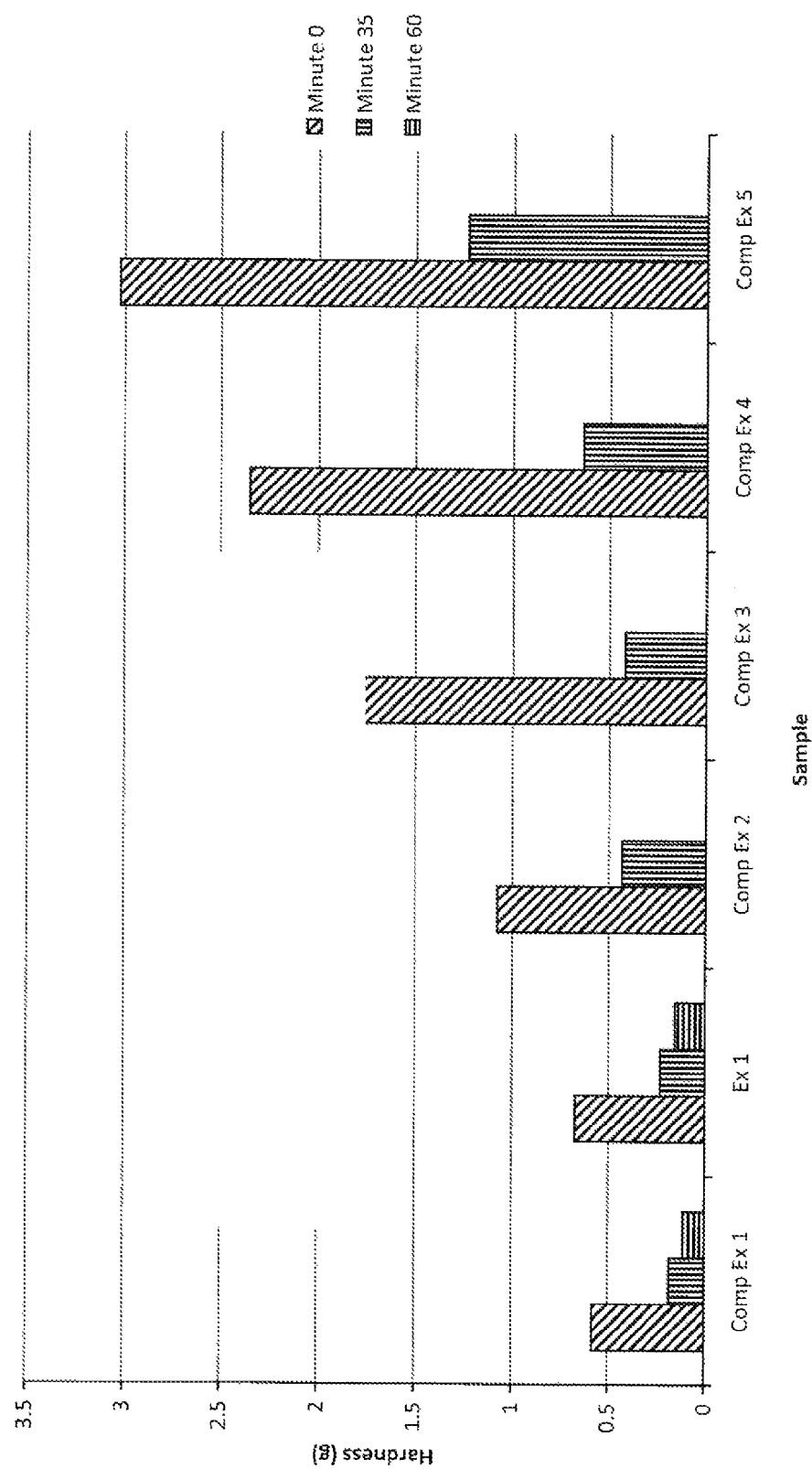
FIG. 1 is a bar chart showing the hardness of a confectionery product in accordance with an embodiment of the invention, a comparative example and prior art confectionery products.

Solid fat content (SFC) was measured using the IUPAC 2.150A method and ISO 8292 method as detailed below.

T1 NMR: IUPAC 2.150A, Short

| | |
|---|---|
| 80° C. | 30 ± 5 minutes |
| 60° C. | 10 ± 2 minutes |
| 0° C. | 60 ± 2 minutes |
| Measuring Temp | 30 ± 1 minute |

ISO 8292 Method 1D Direct, Parallel.

| Name | Clearing Thermal History at 60° C. minutes | First Time at 0° C. minutes | Tempering Time hour | Tempering Temperature ° C. | Second time at 0° C. minutes | Measurement Conditions Type | Time Minutes |
|---|---|---|---|---|---|---|---|
| 1D - Non-stabilizing direct | 15 | n/a | n/a | n/a | 60 ± 2 | parallel | 30 ± 1 |

Hardness

To evaluate the stability of the fillings the hardness was measured over a 60 minute period from 5° C. to 21° C. All the samples were aged over 2 weeks after production at 15° C. to allow the chocolate and fats to fully crystallise followed by 24 hours stored in the fridge at 5° C. to allow the product to settle at consumption temperature. At the start of the test the samples were removed from the fridge, placed on a chopping board (so no heat is absorbed or transferred) at a room temperature of 21° C. The test is then run immediately with a hardness measurement being recorded at every minute interval.

Recipes

| INGREDIENT | Cheese cake filling WT %. (DRY) | Chocolate mousse flavour WT %. (DRY) | Crème caramel WT %. (DRY) |
|---|---|---|---|
| Cheese Powder | 9.54 | 8.60 | 9.53 |
| Cream Powder | 9.54 | 8.60 | 9.53 |
| Icing Sugar | 40.67 | 33.56 | 40.69 |
| FAT SYSTEM A or B | 39.45 | 36.22 | 39.56 |
| SN Lecithin | 0.40 | 0.36 | 0.40 |
| Biscuit Graham Flavour | 0.20 | 0 | 0 |
| Cheesecake Flavour | 0.20 | 0 | 0 |
| Cocoa powder | 0 | 12.66 | 0 |
| Vanilla flavour | 0 | 0 | 0.15 |
| Caramel flavour | 0 | 0 | 0.04 |
| Beta carotene | 0 | 0 | 0.10 |
| TOTAL | 100.00 | 100.00 | 100.0 |

EXAMPLES

The following examples were prepared/obtained:

Examples 1 to 3—a chocolate shell having a flavoured filling therein, wherein the filling comprises a fat system A.

Examples 4 to 6—a chocolate shell having a flavoured filling therein, wherein the filling comprises a fat system B Comparative Example 1—a chocolate shell comprising a filling therein, wherein the filling (cheese cake flavour) comprises a publicly available fat system AAK UNITAO™

Comparative Examples 2 to 5—commercially available products comprising a chocolate shell and soft filling (when consumed at room temperature)

Example 1—a Milk Chocolate Shell Having a Filling, Wherein the Filling (Cheese Cake Flavour) Comprises Fat System A A new fat system A was prepared by blending a specific range of non-lauric triglycerides from palm oil (not palm kernel) mid-fraction. The fat system was blended with the other filling ingredients (detailed above) to form the filling: The fat system A was warmed separately to melt it. The powdered ingredients were warmed in a jacketed Hobart mixer (heated at 45° C.) for 10 minutes. The fat was slowly added to the powder while continuing to mix until a thick paste was achieved. This paste was processed in a roll refiner and the particle size was measured (optimum particle is 16-18 microns). The flaked product was returned to the Hobart and the remaining fat was added with continued mixing. The emulsifier was added and the mixture was conched in the Hobart mixer for 30-60 minutes and was then ready for use. The filling had a water activity at 25° C. of 0.286. The filling was deposited into a chocolate shell and backed off (bottomed). The chocolate shell (cup) had a thickness of 2 mm and was filled with the filling to a height of 7-9 mm. The chocolate backing was 3 mm thick and included crunchy inclusions.

Examples 2 (chocolate mousse) and 3 (crème caramel) were prepared in an analogous way using the ingredients shown in the table above. Examples 4 (cheese cake), 5 (chocolate mousse) and 6 (crème caramel) were prepared using a new fat system B.

The normalised triglyceride profiles (%) of the fat system A and of fat extracted from the fillings of Examples 1 and 5 are shown in the table below.

TABLE

| Sample No. | FAT SYSTEM A | | | FAT FROM EX 1 FILLING | | | FAT FROM EX 5 FILLING | | |
|---|---|---|---|---|---|---|---|---|---|
| | 1 | 2 | Average | 1 | 2 | Average | 1 | 2 | Average |
| Triglycerides | | | | | | | | | |
| PPM | 0.3 | 0.3 | 0.3 | 0.7 | 0.7 | 0.7 | 1.3 | 1.3 | 1.3 |
| PPP | 1.5 | 1.5 | 1.5 | 1.5 | 1.5 | 1.5 | 0.8 | 0.8 | 0.8 |
| MOP | 1.8 | 1.8 | 1.8 | 2.1 | 2.1 | 2.1 | 1.3 | 1.3 | 1.3 |
| PPS | 1 | 1 | 1 | 1 | 1 | 1 | 0.8 | 0.7 | 0.8 |
| POP | 31.7 | 31.5 | 31.6 | 27.0 | 26.9 | 26.9 | 12.2 | 12.1 | 12.2 |
| PLP | 9.7 | 9.6 | 9.6 | 7.7 | 7.7 | 7.7 | 3.6 | 3.5 | 3.6 |
| PSS | 0.7 | 0.7 | 0.7 | 0.8 | 0.8 | 0.8 | 0.5 | 0.5 | 0.5 |
| POS | 5.6 | 5.6 | 5.6 | 5 | 5 | 5 | 13.2 | 13.1 | 13.2 |
| POO | 23.1 | 23.1 | 23.1 | 18.4 | 18.2 | 18.3 | 15.8 | 15.7 | 15.8 |
| PLS | 2.1 | 1.9 | 2 | 1.5 | 1.7 | 1.6 | 2.5 | 2.6 | 2.6 |
| PLO | 9.7 | 9.7 | 9.7 | 7.3 | 7.4 | 7.3 | 5.7 | 5.8 | 5.8 |
| PLL | 2.1 | 2.2 | 2.2 | 1.6 | 1.6 | 1.6 | 1 | 1.1 | 1.1 |
| SSS | 0.2 | 0.2 | 0.2 | 0.3 | 0.2 | 0.2 | 0.3 | 0.4 | 0.4 |
| SOS | 0.6 | 0.6 | 0.6 | 1 | 0.9 | 0.9 | 6.1 | 6.2 | 6.2 |
| SOO | 2.5 | 2.5 | 2.5 | 2.1 | 2.1 | 2.1 | 7.9 | 7.9 | 7.9 |
| SLS + OOO | 0.2 | 0.1 | 0.1 | 0.2 | 0 | 0.1 | 4.7 | 4.7 | 4.7 |
| SLO | 3.3 | 3.3 | 3.3 | 2.6 | 2.8 | 2.7 | 2.5 | 2.5 | 2.5 |
| OLO | 1.2 | 1.1 | 1.1 | 0.9 | 0.9 | 0.9 | 1.7 | 1.7 | 1.7 |
| SLL | 1.4 | 1.4 | 1.4 | 1.1 | 1 | 1.1 | 0.3 | 0.3 | 0.3 |
| AOS | 0.1 | 0.1 | 0.1 | 0.1 | 0.1 | 0.1 | 0.5 | 0.5 | 0.5 |
| AOO | 0.2 | 0.2 | 0.2 | 0.1 | 0.1 | 0.1 | 0.3 | 0.3 | 0.3 |
| Unidentified | 1.3 | 1.6 | 1.4 | 2.1 | 1.8 | 2 | 1.6 | 1.6 | 1.6 |
| DAG and additional TAG from Milk fat | | | | 15.1 | 15.5 | 15.3 | 15.5 | 15.5 | 15.5 |

The fat was extracted from the filling samples using acid hydrolysis followed by solvent extraction. The fat was dissolved in trimethyl pentane and analysed by gas chromatography on a CP TAP 25 m×0.25 mm×0.1 µm GC column.

The normalised Fatty Acid profiles (%) of the fat system A and of the fat extracted from the filling in Examples 1 and 5 are shown in table below.

TABLE

| Sample No. | FAT SYSTEM A | | | FAT FROM FILLING EX 1 | | | FAT FROM FILLING EX 5 | | |
|---|---|---|---|---|---|---|---|---|---|
| | 1 | 2 | Average | 1 | 2 | Average | 1 | 2 | Average |
| Fatty Acids (C:D) | | | | | | | | | |
| C4:0 | 0 | 0 | 0 | 0 | 0.1 | 0.1 | 0 | 0 | 0 |
| C6:0 | 0 | 0 | 0 | 0.1 | 0.1 | 0.1 | 0.1 | 0.2 | 0.2 |
| C8:0 | 0 | 0 | 0 | 0.1 | 0.1 | 0.1 | 0.1 | 0.1 | 0.1 |
| C10:0 | 0 | 0 | 0 | 0.2 | 0.3 | 0.2 | 0.2 | 0.2 | 0.2 |
| C12:0 | 0.2 | 0.2 | 0.2 | 0.7 | 0.7 | 0.7 | 0.4 | 0.4 | 0.4 |
| C14:0 | 0.9 | 0.9 | 0.9 | 2.3 | 2.4 | 2.4 | 1.6 | 1.7 | 1.7 |
| C14:1 | 0 | 0 | 0 | 0.1 | 0.1 | 0.1 | 0.2 | 0.1 | 0.2 |
| C15:0(I) | 0 | 0 | 0 | 0.1 | 0.1 | 0.1 | 0.1 | 0.1 | 0.1 |
| C15:0 | 0.1 | 0 | 0.1 | 0.2 | 0.2 | 0.2 | 0.2 | 0.2 | 0.2 |
| C16:0(I) | 0 | 0 | 0 | 0 | 0 | 0 | 0.1 | 0.2 | 0.2 |
| C16:0 | 40.2 | 40.2 | 40.2 | 39 | 39 | 39 | 26.3 | 26.6 | 26.5 |
| C16:1 | 0.2 | 0.2 | 0.2 | 0.4 | 0.4 | 0.4 | 0.3 | 0.3 | 0.3 |
| C17:0(I) | 0 | 0 | 0 | 0.1 | 0.1 | 0.1 | 0 | 0 | 0 |
| C17:0 | 0.1 | 0.1 | 0.1 | 0.2 | 0.2 | 0.2 | 0.2 | 0.2 | 0.2 |
| C18:0(I) | 0 | 0 | 0 | 0.1 | 0.1 | 0.1 | 0.1 | 0 | 0.1 |

TABLE-continued

| Sample No. | FAT SYSTEM A | | | FAT FROM FILLING EX 1 | | | FAT FROM FILLING EX 5 | | |
|---|---|---|---|---|---|---|---|---|---|
| | 1 | 2 | Average | 1 | 2 | Average | 1 | 2 | Average |
| C18:0 | 5.1 | 5.2 | 5.2 | 6.6 | 6.5 | 6.6 | 18.3 | 18.2 | 18.3 |
| C18:1(trans) | 0.1 | 0.1 | 0.1 | 0.5 | 0.5 | 0.5 | 0.5 | 0.6 | 0.6 |
| C18:1 (cis) | 41.5 | 41.5 | 41.5 | 38.8 | 38.6 | 38.7 | 41.4 | 41.5 | 41.5 |
| C18:2(trans) | 0.3 | 0.3 | 0.3 | 0.3 | 0.3 | 0.3 | 0.3 | 0.1 | 0.2 |
| C18:2(cis) | 10.4 | 10.3 | 10.3 | 8.9 | 8.9 | 8.9 | 7.7 | 7.8 | 7.8 |
| C18:3(trans) | 0.1 | 0.1 | 0.1 | 0.1 | 0.1 | 0.1 | 0 | 0 | 0 |
| C18:3(alpha) | 0.2 | 0.2 | 0.2 | 0.3 | 0.3 | 0.3 | 0.3 | 0.3 | 0.3 |
| C20:0 | 0.4 | 0.4 | 0.4 | 0.4 | 0.4 | 0.4 | 0.9 | 0.8 | 0.9 |
| C20:1 | 0.2 | 0.2 | 0.2 | 0.3 | 0.3 | 0.3 | 0.5 | 0.3 | 0.4 |
| C22:0 | 0.1 | 0.1 | 0.1 | 0.1 | 0.1 | 0.1 | 0.2 | 0.2 | 0.2 |
| C24:0 | 0.1 | 0.1 | 0.1 | 0.1 | 0.1 | 0.1 | 0.1 | 0 | 0.1 |
| Saturated FA | | | 47 | | | 50 | | | 49 |
| Unsaturated FA | | | 53 | | | 50 | | | 51 |

C:D = number of carbon atoms:number of double bonds

Comparative Example 1

Example 1 was repeated with the commercially available AAK UNITAO™ fat (Aarhus United) in place of the fat system described above. UNITAO™ is described as a semi-liquid palm oil for snacks and frozen food. The resulting filling had a water activity at 25° C. of 0.249.

Solid Fat Content

The solid fat content (SFC) of the fat systems employed in Example 1 and Comparative Example 1 were measured together with fat extracted from the Example 1 filling.

| METHOD | | SFC @ 0° C. | SFC @ 10° C. | SFC @ 15° C. | SFC @ 20° C. | SFC @ 25° C. | SFC @ 30° C. | Ratio |
|---|---|---|---|---|---|---|---|---|
| IUPAC 2.150A | Comp Ex 1 fat system (UNITAO™) | | 34.4 | | 4.2 | | | 8.2 |
| ISO 8292 | Ex 1 fat system (FAT SYSTEM A) | 55.1 | 35.2 | 20.1 | 9.6 | 4.9 | 2.4 | 3.6 |
| ISO 8292 | Ex 1 filling | 60.8 | 37.8 | 20.8 | 8.5 | 5.2 | 3.7 | 4.4 |

Ratio = ratio of SFC at 10° C. to SFC at 20° C.

Hence it can be seen that both Ex 1 and Comp Ex 1 have similar SFC values at 10° C. However, the SFC values diverge as the temperature increases. Comp Ex 1 has a lower SFC value at 20° C. (4.2 compared to 9.6). It should be noted that Ex 1 has an SFC value at 25° C. (4.9) that is slightly greater than Comp Ex 1 at 20° C. (4.2). Comp Ex 1 has a negligible SFC at 30° C. whereas Ex 1 maintains a value of >2%. This means that the Ex 1 fat system and filling can be stored and transported at ambient temperature. The SFC values for the fat system A and the resulting filling are similar.

Hardness

The data are summarised in the table below and shown in FIGS. 1 (bar chart) and 2 (graph).

| Sample | Centre Filling Hardness (g) | | |
|---|---|---|---|
| | Minute 0 | Minute 35 | Minute 60 |
| Comp Ex 1 | 0.584 | 0.184 | 0.111 |
| Ex 1 | 0.672 | 0.231 | 0.157 |
| Comp Ex 2 (Amavel Mousse au Chocolat) | 1.075 | 0.432 | |
| Comp Ex 3 (Cadbury Koko) | 1.782 | 0.419 | |

-continued

| Sample | Centre Filling Hardness (g) | | |
|---|---|---|---|
| | Minute 0 | Minute 35 | Minute 60 |
| Comp Ex 4 (Milka Kleines Dankeschon Alpenmilch-Crème) | 2.352 | 0.638 | |
| Comp Ex 5 (Cadbury Little Praline Hearts) | 3.025 | 1.233 | |

When first removed from the fridge (0 minutes) the Ex 1 and Comp Ex 1 fillings have similar hardness. They are both significantly softer than the fillings from the commercially available comparative examples 2 to 5, which are conventional chocolate bars having a soft filling when served at room temperature. Even at low temperature Ex 1 and Comp Ex 1 provide a contrast between the crisp chocolate shell and the soft interior. The conventional bars are harder and more difficult to bite into.

After 35 minutes all of the samples have begun to warm to room temperature and become softer. The conventional chocolate bars are now suitable for eating and the structure of Comp Ex 1 and Ex 1 is soft but still intact.

The hardness profiles of the fillings in Ex 1 and Comp Ex 1 are compared in FIG. 2. Although the fillings of Ex 1 and Comp Ex 1 have similar hardness at 5° C., their properties are different at higher temperature Ex 1 is 15% harder than Comp Ex 1 at 5° C. and 41% harder at 21° C. This is shown by the different gradients in the graphs of FIG. 2. Ex 1 maintains a greater hardness over the time of the time of the test. This means that though Ex 1 and Comp Ex 1 have similar sensory properties at low temperature, Ex 1 is more robust at higher temperatures and therefore better suited to storage and transport at ambient temperatures.

The invention claimed is:

1. A confectionery composition comprising a fat system, the composition comprising an edible shell having a filling therein and the fat system being in an amount of 30 to 50% by weight, wherein:
   the fat system comprises mid-fraction palm oil;
   the filling has a solid fat content (SFC) of 35 to 65% at 0° C., 7 to 15% at 20° C., and 1 to 8% at 30° C.;
   the filling comprises fatty acids and therefore has a fatty acid profile, the fatty acid profile of the filling comprising 20 to 50% C16:0 and 20 to 50% C18:1 (cis); and
   the filling comprises triglycerides and therefore has a triglyceride profile, wherein the triglyceride profile of the filling comprises 10 to 15% POP, 10 to 20% POO, 3 to 10% PLO and 3 to 5% PLP.

2. The composition of claim 1, wherein the filling further comprises one or more triglycerides from the group comprising PPM, PPP, MOP, PPS, PPS, POS, PLS, PLL, SSS, SOS, SOO, SLS+OOO, SLO, OLO, SLL, AOS, AOO and combinations thereof.

3. The composition of claim 1, wherein the filling comprises one or more fatty acids from the group comprising C4:0, C6:0, C8:0, C10:0, C12:0, C14:0, C14:1, C15:0(1), C15:0, C16:0, C16:1, C17:0(1), C17:0, C18:0(1), C18:1 (trans), C18:1(cis), C18:2(trans), C18:2(cis), C18:3 (gamma), C18:3(alpha), C20:0, C20:1, C22:0, C24:0 35 and combinations thereof.

4. The composition of claim 1, wherein the filling has at least one of the following properties:
   (i) a SFC at 0° C. of from 40 to 65%;
   (ii) a SFC at 10° C. of from 20 to 50%;
   (iii) a SFC at 15° C. of from 15 to 30%; or
   (iv) a SFC at 25° C. of from 2 to 12%.

5. The composition of claim 1, wherein the filling has a SFC at 0° C. of from 40 to 65%, an SFC at 10° C. of from 30 to 50%, an SFC at 15° C. of from 18% to 25%, an SFC at 20° C. of from 8 to 15%, an SFC at 25° C. of from 4 to 10% and an SFC at 30° C. of from 2 to 5%.

6. The composition of claim 1, wherein the ratio of the SFC at 10° C. to the SFC at 20° C. is from 2 to 5.

7. The composition of claim 1, wherein the filling has the following hardness profile when the filling, having an initial temperature of 5° C. at 0 minutes, is stored for 60 minutes at a temperature of 21° C.:
   0.5 g to 0.8 g at 0 minutes;
   0.2 g to 0.4 g at 30 minutes; and
   0.1 g to 0.2 g at 60 minutes.

8. The composition of claim 1, wherein the shell is a chocolate shell.

9. The composition of claim 1, wherein the shell has a thickness of from 1 to 3 mm.

10. The composition of claim 1, wherein the filling comprises at least one of the following:
    (i) from 30 to 45% bulk sweetener;
    (ii) from 10% to 25% dairy-based powder; or
    (iii) from 5 to 15% cocoa powder.

11. The composition of claim 1, wherein filling is aerated.

12. The composition of claim 1, wherein the filling has a density of from 0.7 to 1.0 g/cm3.

13. The composition of claim 1, wherein the filling has a water activity at 25° C. of less than 0.3.

14. The composition of claim 1, wherein the filling or the fat system has an SFC at 10° C. of from 32 to 38%.

15. The composition of claim 1, wherein the filling or the fat system has an SFC at 30° C. of from 1.5 to 5%.

16. The composition of claim 1, wherein the triglyceride profile further comprises 3 to 15% POS.

* * * * *